(12) United States Patent
Mather et al.

(10) Patent No.: US 8,708,393 B2
(45) Date of Patent: Apr. 29, 2014

(54) STOWABLE SEATING ARRANGEMENT FOR A VEHICLE

(75) Inventors: Carl Mather, Lake Orion, MI (US); David M. Savinsky, Clay, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 31 days.

(21) Appl. No.: 13/531,750

(22) Filed: Jun. 25, 2012

(65) Prior Publication Data

US 2013/0341952 A1    Dec. 26, 2013

(51) Int. Cl.
*B60N 2/12* (2006.01)

(52) U.S. Cl.
USPC ..................... 296/65.09; 296/65.13

(58) Field of Classification Search
USPC ............. 296/65.05, 65.09, 65.13, 37.14; 297/316, 325, 334, 332
See application file for complete search history.

(56) References Cited

U.S. PATENT DOCUMENTS

| | | |
|---|---|---|
| 364,011 A | 5/1887 | Hale |
| 417,823 A | 12/1889 | Hale |
| 491,761 A | 2/1893 | Aze et al. |
| 512,539 A | 12/1893 | Cushing |
| 566,675 A | 8/1896 | Forney |
| 613,423 A | 11/1898 | Pickles |
| 615,227 A | 11/1898 | Pickles |
| 675,367 A | 12/1900 | Gilfillan |
| 679,081 A | 7/1901 | Koehler |
| 717,208 A | 12/1902 | Janson |
| 725,996 A | 4/1903 | Siegel |
| 730,853 A | 6/1903 | Kohout |
| 751,277 A | 2/1904 | Frederick |
| 795,501 A | 7/1905 | Fassett |
| 805,802 A | 11/1905 | Kohout |
| 808,905 A | 1/1906 | Curwen |
| 809,084 A | 1/1906 | Bennett et al. |
| 814,514 A | 3/1906 | Budd |
| 830,410 A | 9/1906 | Budd et al. |
| 842,298 A | 1/1907 | Budd et al. |
| 848,201 A | 3/1907 | Pickles |
| 935,242 A | 9/1909 | Witte |
| 1,140,097 A | 5/1915 | Anger |
| 1,140,342 A | 5/1915 | Anger |
| 1,169,727 A | 1/1916 | Lang |

(Continued)

FOREIGN PATENT DOCUMENTS

| | | |
|---|---|---|
| CH | 287456 | 11/1952 |
| DE | 4336710 | 4/1994 |

(Continued)

*Primary Examiner* — Jason S Morrow
(74) *Attorney, Agent, or Firm* — Ralph E. Smith

(57) ABSTRACT

A seat assembly can include a seat bottom, a pair of front and rear legs and an articulation arrangement. The front legs can have an upper and a lower end, where each upper end can be pivotably coupled to the seat bottom. The articulation arrangement can include a pair of rotating members, a pair of guide channels, a pair of first and second guide members, and an assist arrangement. The rotating members can be rotatably coupled to the lower ends of the front legs, and the pair of guide channels can have the first guide members positioned therein. The second guide members can be coupled to the lower ends of the front legs and positioned in the guide channels. The assist arrangement can include a biasing member coupled to the vehicle and the front legs. The seat assembly can be movable from a deployed position to a stowed position.

20 Claims, 16 Drawing Sheets

(56) References Cited

U.S. PATENT DOCUMENTS

| | | |
|---|---|---|
| 1,169,728 A | 1/1916 | Lang |
| 1,196,902 A | 9/1916 | Thompson |
| 1,196,908 A | 9/1916 | Walker |
| 1,214,124 A | 1/1917 | Bennett |
| 1,231,205 A | 6/1917 | Schechter |
| 1,240,244 A | 9/1917 | Ogle |
| 1,252,748 A | 1/1918 | Walker |
| 1,298,823 A | 4/1919 | Taylor |
| 1,301,020 A | 4/1919 | Walker |
| 1,360,966 A | 11/1920 | Marsh |
| 1,412,139 A | 4/1922 | Schechter |
| 1,488,659 A | 4/1924 | Abel et al. |
| 1,782,231 A | 11/1930 | Cross et al. |
| 1,968,434 A | 7/1934 | Bell |
| 2,726,708 A | 12/1955 | Eickhorn et al. |
| 3,265,435 A | 8/1966 | Bilancia |
| 3,313,570 A | 4/1967 | McVeigh |
| 3,877,746 A | 4/1975 | Christine et al. |
| 4,081,051 A | 3/1978 | Logsdon |
| 4,322,052 A | 3/1982 | Hodge et al. |
| 4,407,542 A | 10/1983 | Kehl et al. |
| 4,840,427 A | 6/1989 | Hong |
| 5,076,640 A | 12/1991 | Bulte |
| 5,322,341 A | 6/1994 | Harrison et al. |
| 5,362,124 A | 11/1994 | Schlidt |
| 5,570,931 A | 11/1996 | Kargilis et al. |
| 6,089,641 A | 7/2000 | Mattarella et al. |
| 6,123,380 A * | 9/2000 | Sturt et al. ............ 296/65.09 |
| 6,174,017 B1 | 1/2001 | Salani et al. |
| 6,179,375 B1 | 1/2001 | Lane |
| 6,227,619 B1 | 5/2001 | Pesta et al. |
| 6,629,721 B1 | 10/2003 | Macey |
| 6,715,825 B2 | 4/2004 | Tame |
| 6,817,670 B2 | 11/2004 | Macey |
| 6,869,138 B2 | 3/2005 | Rhodes et al. |
| 6,905,155 B1 | 6/2005 | Presley et al. |
| 6,918,625 B2 | 7/2005 | Storto et al. |
| 6,932,424 B2 | 8/2005 | Rhodes et al. |
| 6,955,386 B2 | 10/2005 | Rhodes et al. |
| 6,962,384 B2 | 11/2005 | Rhodes et al. |
| 6,981,744 B2 | 1/2006 | Elterman et al. |
| 7,066,519 B2 | 6/2006 | Rhodes et al. |
| 7,077,451 B2 | 7/2006 | Rhodes et al. |
| 7,188,883 B2 | 3/2007 | Van Dyk et al. |
| 7,240,949 B1 | 7/2007 | Moushegian et al. |
| 7,300,105 B2 | 11/2007 | Jasinski, II et al. |
| 7,377,571 B2 | 5/2008 | Ewers et al. |
| 7,891,737 B2 | 2/2011 | Mather et al. |
| 8,485,583 B2 * | 7/2013 | Mather et al. ............ 296/65.09 |
| 2008/0224524 A1 | 9/2008 | Mather et al. |
| 2013/0154299 A1 * | 6/2013 | Mather et al. ............ 296/65.09 |

FOREIGN PATENT DOCUMENTS

| | | |
|---|---|---|
| GB | 318676 | 9/1929 |
| GB | 699609 | 11/1953 |
| WO | 01/70537 | 9/2001 |

* cited by examiner

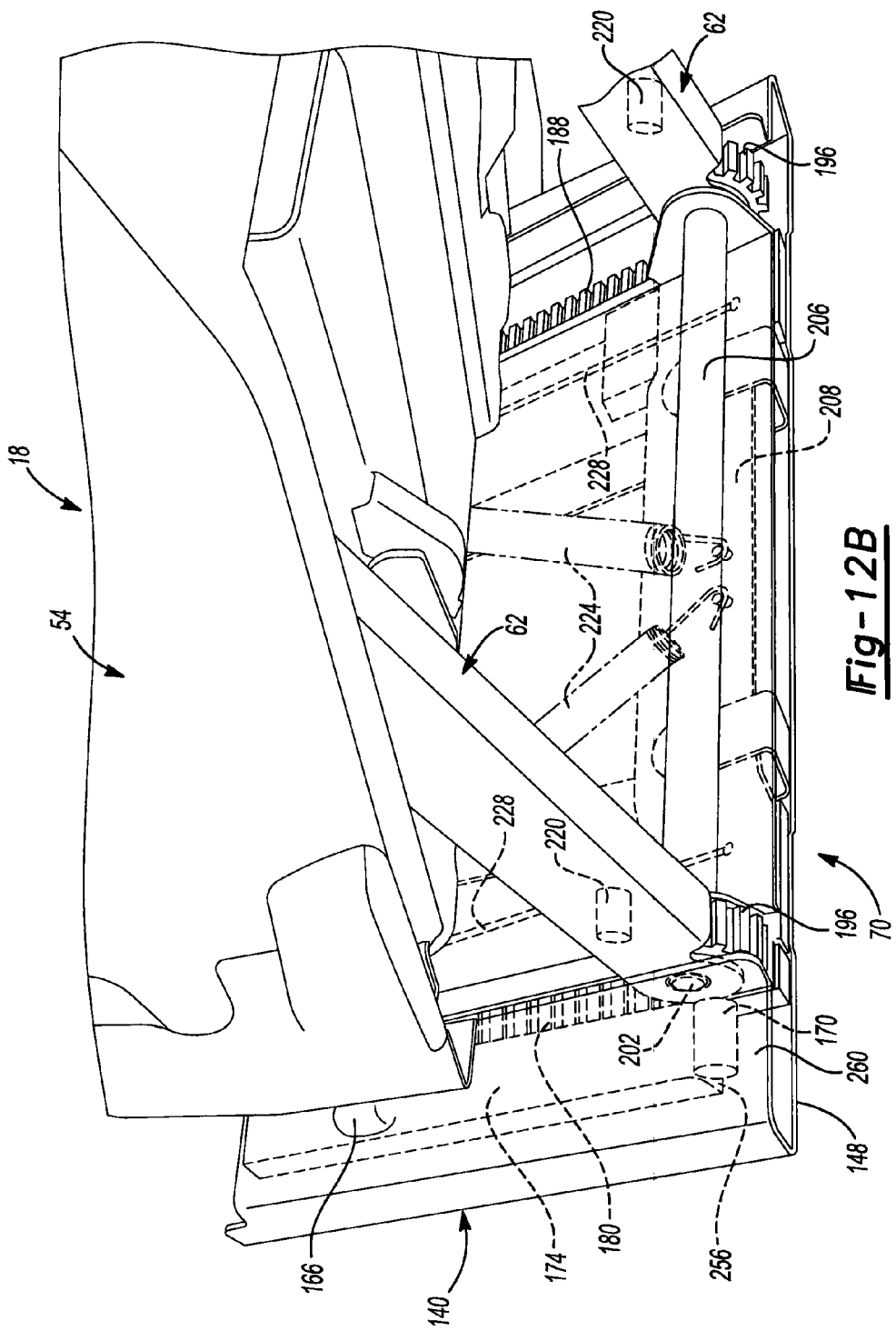

ly stowable on-board the vehicle when not in use to provide additional or improved storage capacity for carrying cargo. One potential solution to this desire for additional storage capacity is a seat assembly that is capable of being stowed to provide a flat load floor. One drawback of the current stowable seat assemblies is the complexity of the arrangements utilized to facilitate stowage of the seats. Another drawback of the current stowable seat assemblies is a need for the seats to be turned or flipped upside down such that a seating side of the seat bottom is facing a floor of a stowage tub in order to stow the seat assembly. To deploy the stowed seat, a user will then typically need to rotate the seat in an opposite manner from the stowed position in the stowage tub.

STOWABLE SEATING ARRANGEMENT FOR A VEHICLE

FIELD

The present disclosure relates generally to seating arrangements for a vehicle and, more particularly, to a stowable seating arrangement for a vehicle.

BACKGROUND

In motor vehicles such as vans, mini-vans and sport utility vehicles, it is desirable that passenger seating arrangements be optionally stowable on-board the vehicle when not in use to provide additional or improved storage capacity for carrying cargo. One potential solution to this desire for additional storage capacity is a seat assembly that is capable of being stowed to provide a flat load floor. One drawback of the current stowable seat assemblies is the complexity of the arrangements utilized to facilitate stowage of the seats. Another drawback of the current stowable seat assemblies is a need for the seats to be turned or flipped upside down such that a seating side of the seat bottom is facing a floor of a stowage tub in order to stow the seat assembly. To deploy the stowed seat, a user will then typically need to rotate the seat in an opposite manner from the stowed position in the stowage tub.

Thus, while stowable seat assemblies have generally worked for their intended purpose, there remains a need for continuous improvement in the relevant art.

SUMMARY

In one form, a stowable seat assembly for a vehicle having a floor is provided in accordance with the teachings of the present disclosure. The stowable seat assembly can include a seat bottom, a seat back coupled relative to the seat bottom, a pair of front legs, a pair of rear legs and an articulation arrangement. The pair of front legs can each have an upper end and an opposite lower end, where each upper end can be pivotably coupled to the seat bottom. The pair of rear legs can be pivotably coupled to the seat bottom. The articulation arrangement can include a pair of rotating members, a pair of guide channels, a pair of first and second guide members, and an assist arrangement. The pair of rotating members can be rotatably coupled to the lower ends of the front legs. The pair of guide channels can each have a first guide member positioned therein, and the pair of second guide members can be coupled to the lower ends of the front legs and can be each positioned in one of the pair of guide channels. The assist arrangement can include a biasing member coupled to the vehicle and the front legs. The seat assembly can be selectively movable from a deployed position to a stowed position whereby the seat bottom can be articulated forward and downward about the front legs to the stowed position, during which the second guide members can be selectively movable in the guide channels and relative to the first guide members to enable the front legs to selectively translate from a first position associated with the deployed position to a second position associated with the stowed position of the seat assembly. The biasing member can be configured to provide a biasing force against the translation of the front legs in a first direction from the first position to the second position, and a biasing force assisting in the translation of the front legs in a second opposite direction from the second position toward the first position.

In another form, a stowable seat assembly for a vehicle having a floor and a stowage recess is provided in accordance with the teachings of the present disclosure. The stowable seat assembly can include a seat bottom having a forward end and an opposite rearward end, a seat back coupled relative to the seat bottom, a pair of front legs, a pair of rear legs and an articulation arrangement. The pair of front legs can each have an upper end and an opposite lower end, where each upper end can be pivotably coupled to the seat bottom proximate the forward end. The pair of rear legs can be pivotably coupled to the seat bottom proximate the rearward end. The articulation arrangement can include a pair of rotating members, a pair of guide channels, a pair of first and second guide members, a pair of guide tracks, and an assist arrangement. The pair of rotating members can be rotatably coupled to the lower ends of the front legs. The pair of guide channels can each have a first guide member positioned therein, and the pair of second guide members can be coupled to the lower ends of the front legs and each positioned in one of the pair of guide channels. The pair of rotating members can be in selective movable engagement with the pair of guide tracks. The assist arrangement can include a biasing member coupled to the vehicle and the front legs. The seat assembly can be selectively movable from a deployed position to a stowed position whereby the seat bottom can be articulated forward and downward about the front legs to the stowed position in the stowage recess, during which the second guide members can be selectively movable in the guide channels and relative to the first guide members to enable the front legs to selectively translate from a first position associated with the deployed position to a second position associated with the stowed position of the seat assembly. The biasing member can be configured to provide a biasing force against the translation of the front legs in a first direction from the first position to the second position, and a biasing force assisting in the translation of the front legs in a second opposite direction from the second position toward the first position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 12B is a partial perspective view of the articulation arrangement as the outboard seat is further articulated toward the stowed position according to the principles of the present disclosure;

DETAILED DESCRIPTION

Figure 1:
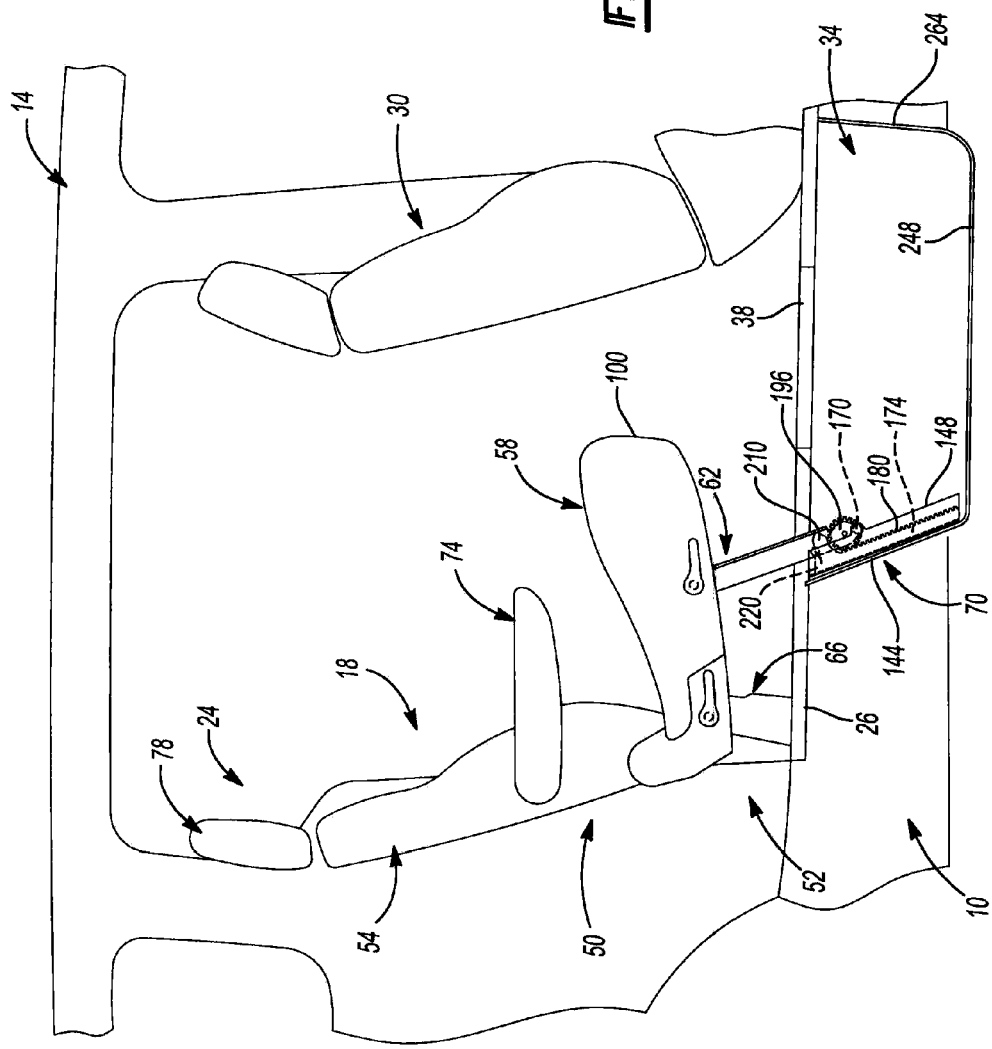
FIG. 1 is a partial side view of an exemplary first and second row seating arrangement in a motor vehicle illustrating an outboard seat in an exemplary deployed position according to the principles of the present disclosure.

With initial reference to FIG. 1, a stowable seating arrangement 10 is provided for a vehicle 14 in accordance with the present teachings and can include outboard seat assemblies 18 and an inboard or center seat assembly (not shown). As shown, the seating arrangement 10 may be for a second row of seating 24 for the vehicle 14 and can include outboard seat assemblies 18 and the center seat assembly in a side-by-side configuration. Vehicle 14 can generally include a floor 26, a first row of seating 30, a stowage recess 34 configured to receive the stowable seating arrangement 10, and stowage recess cover 38 for covering an opening to the recess.

As will be discussed in greater detail below, each of the seat assemblies 18 can be individually stowed into the stowage recess 34 to provide a flat load floor vehicle configuration, as shown for example in FIG. 13A. In this manner, when outboard seat assemblies 18 and the center seat assembly are deployed, a bench seating arrangement can be provided. When the center seat assembly is stowed, a passageway can be provided to a rearward area of the vehicle for access to a cargo area and/or a third row of seating (not shown). In addition to being stowable, the seat assemblies 18 of the present teachings can also include ingress/egress adjustment capabilities, as well as fore-aft adjustment capabilities.

With additional reference to FIGS. 1-13C, the outboard seat assemblies 18 will now be discussed in greater detail. It should be appreciated that outboard seat assemblies 18 and the center seat assembly can include the same or substantially the same configuration. It should also be appreciated that several features of seat assembly 18 will be generally discussed below in connection with an outboard side 50 of seat assembly 18 shown in the figures. In this regard, when duplicate components are discussed, such as a pair of front legs and an associated pair of brackets, it should be appreciated that an inboard side of the seat assembly 18 opposite the outboard side 50 can have the same structure and operation with respect to such components and/or features and will thus not be further discussed in detail herein. It should further be appreciated that while the discussion will continue with reference to the seat assembly 18 associated with a passenger side 52 of vehicle 14, the seat assembly 18 associated with a driver side (not shown) of vehicle 14 can have the same configuration.

In one exemplary configuration, outboard seat assembly 18 can include a seat back 54, a seat bottom 58, a first pair of front legs 62, a second pair of rear legs 66 each operatively associated with the seat bottom 58, and an articulation arrangement 70. As will be discussed in greater detail below, the articulation arrangement 70 can be configured to assist in articulating and lowering seat assembly 18 toward a stowed position and articulating and raising seat assembly 18 from the stowed position toward a deployed position.

Figure 5:
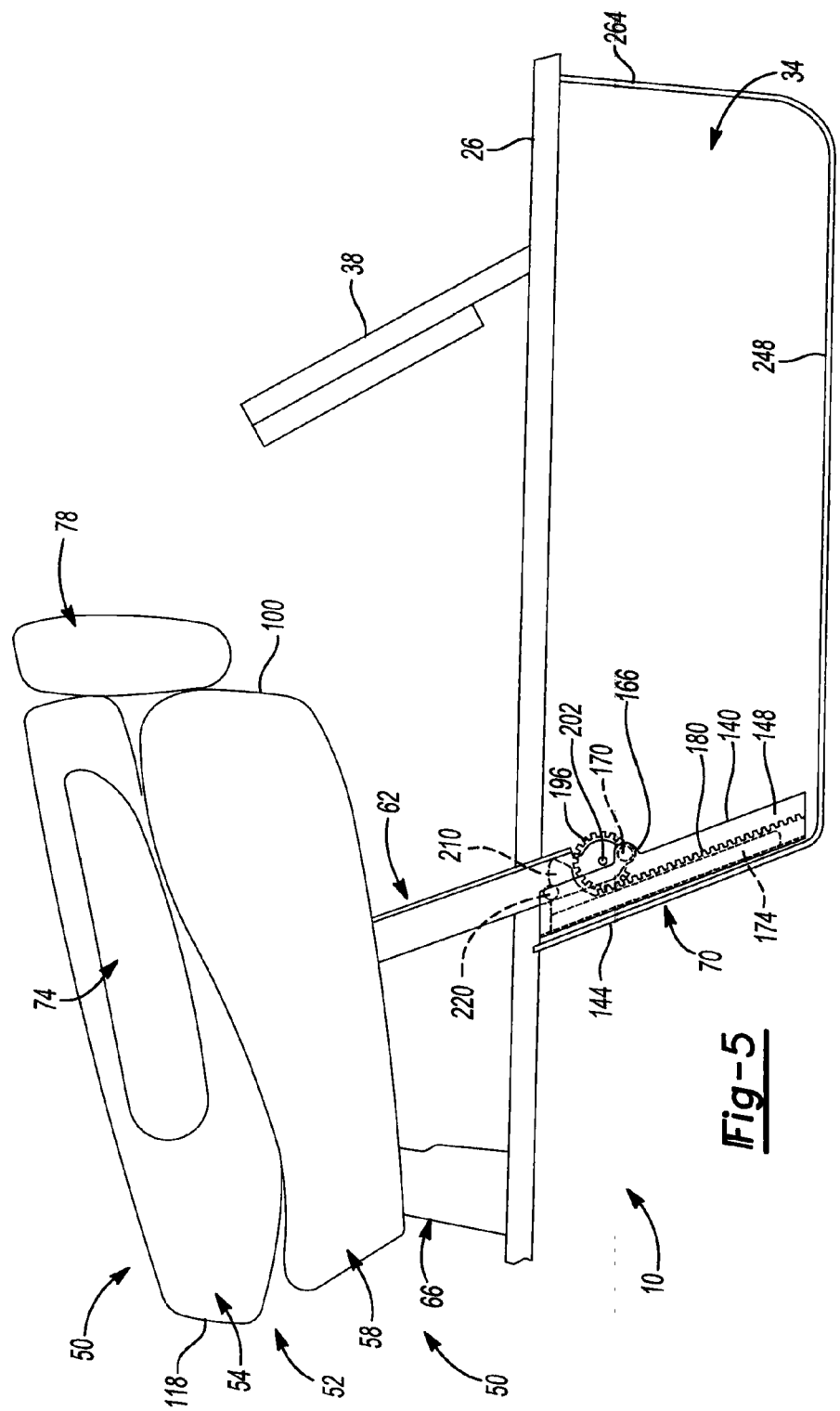
FIG. 5 is a partial side view of the outboard seat with the seatback and head rest in collapsed positions according to the principles of the present disclosure.

Seat back 54 can include a pair of arm rests 74 and a head rest 78 each coupled to the seat back 54 in any suitable manner. Seat back 54 can also include a first release mechanism 82 (FIG. 2) to facilitate collapsing seat back 54 to a collapsed position (FIG. 5). An optional second release mechanism 86 (FIG. 2) can be associated with seat assembly 18 in any suitable position and can be operably coupled to the rear legs 66 and/or articulation arrangement 70 in any suitable manner to facilitate releasing the seat assembly 18 from the deployed position.

Figure 2:
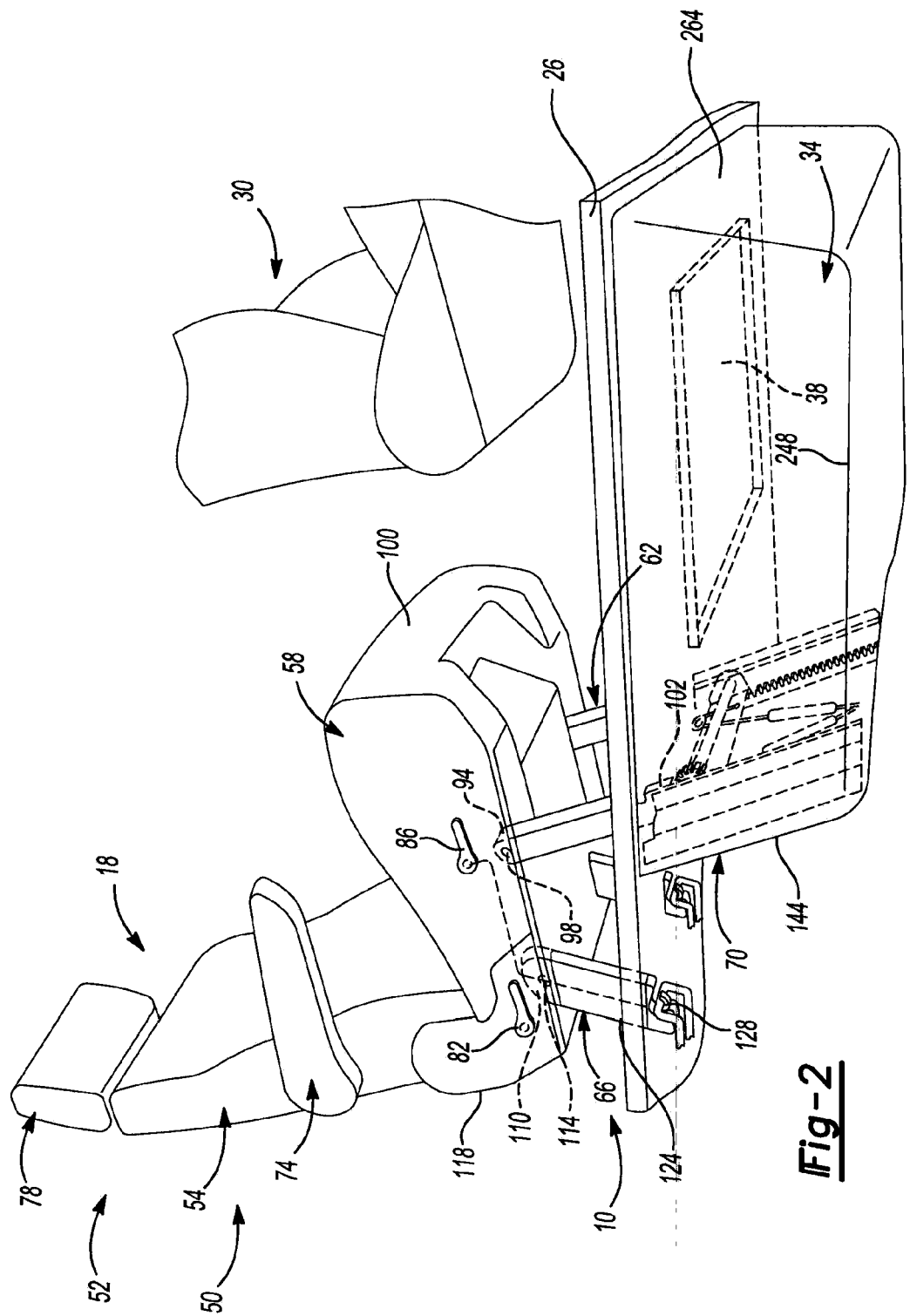
FIG. 2 is a bottom perspective view of the outboard seat of FIG. 1 in the deployed position according to the principles of the present disclosure.

A first or upper end 94 of each leg of the front legs 62 can be pivotably coupled 98 to seat bottom 58, and a second or lower end 102 of legs 62 can be operatively coupled 106 (FIG. 3) to articulation arrangement 70 for selective movement relative thereto, as will be discussed below. A first or upper end 110 of rear legs 66 can each be pivotably coupled 114 to seat bottom 58 proximate a rearward end 118 thereof. A second or lower end 124 of rear legs 66 can each include a latch arrangement 128 for releasably coupling rear legs 66 to vehicle 14, such as the floor 26 or a similar frame or structural member, as generally shown in FIG. 2. In the exemplary configuration illustrated, the front legs 62 can be pivotably coupled 98 to the seat bottom 58 between a forward end 100 and the rearward end 118, as shown for example in FIG. 2.

Figure 3:
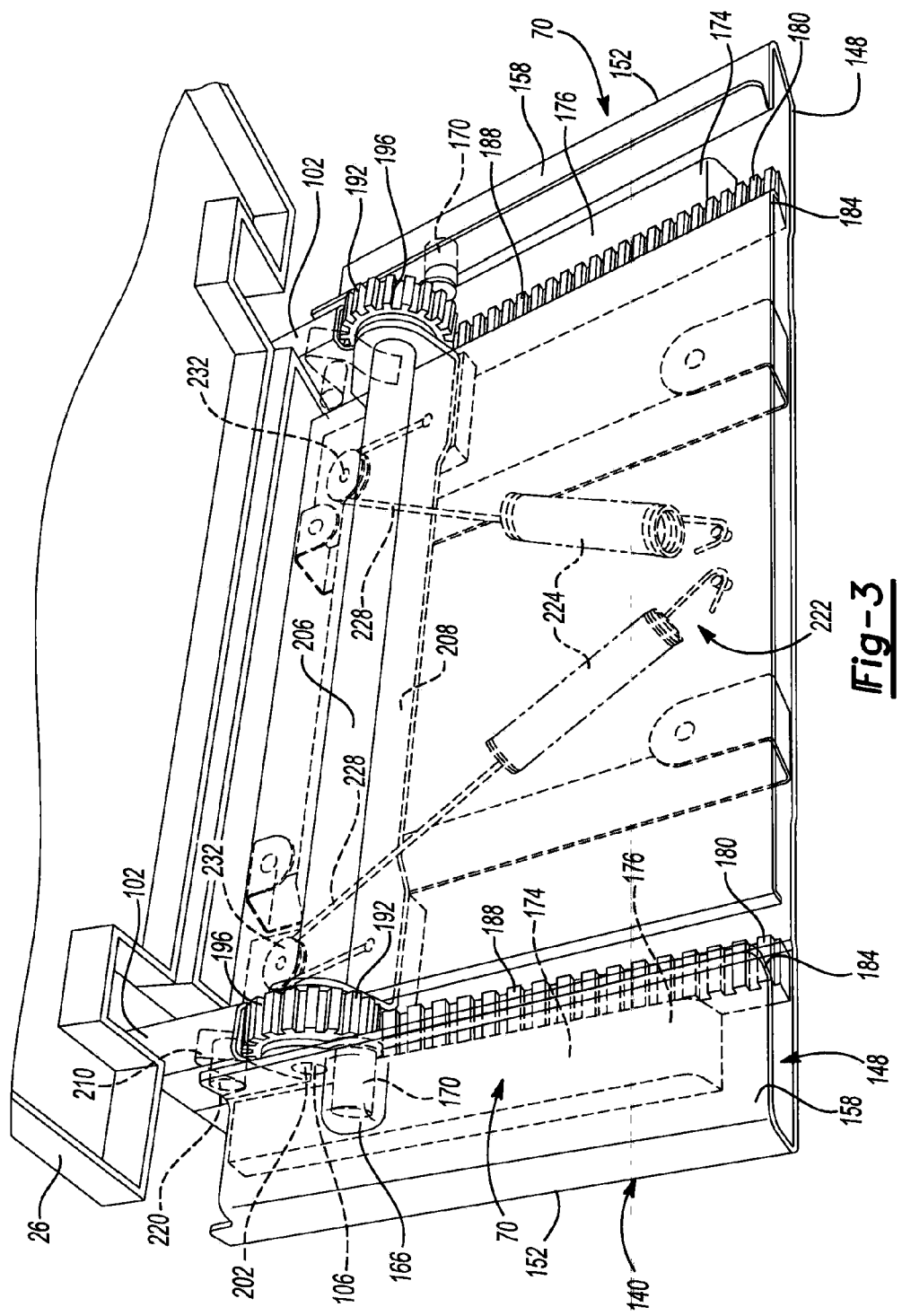
FIG. 3 is a partial perspective view of an exemplary articulation arrangement associated with the outboard seat of FIG. 1 according to the principles of the present disclosure.
Figure 4:
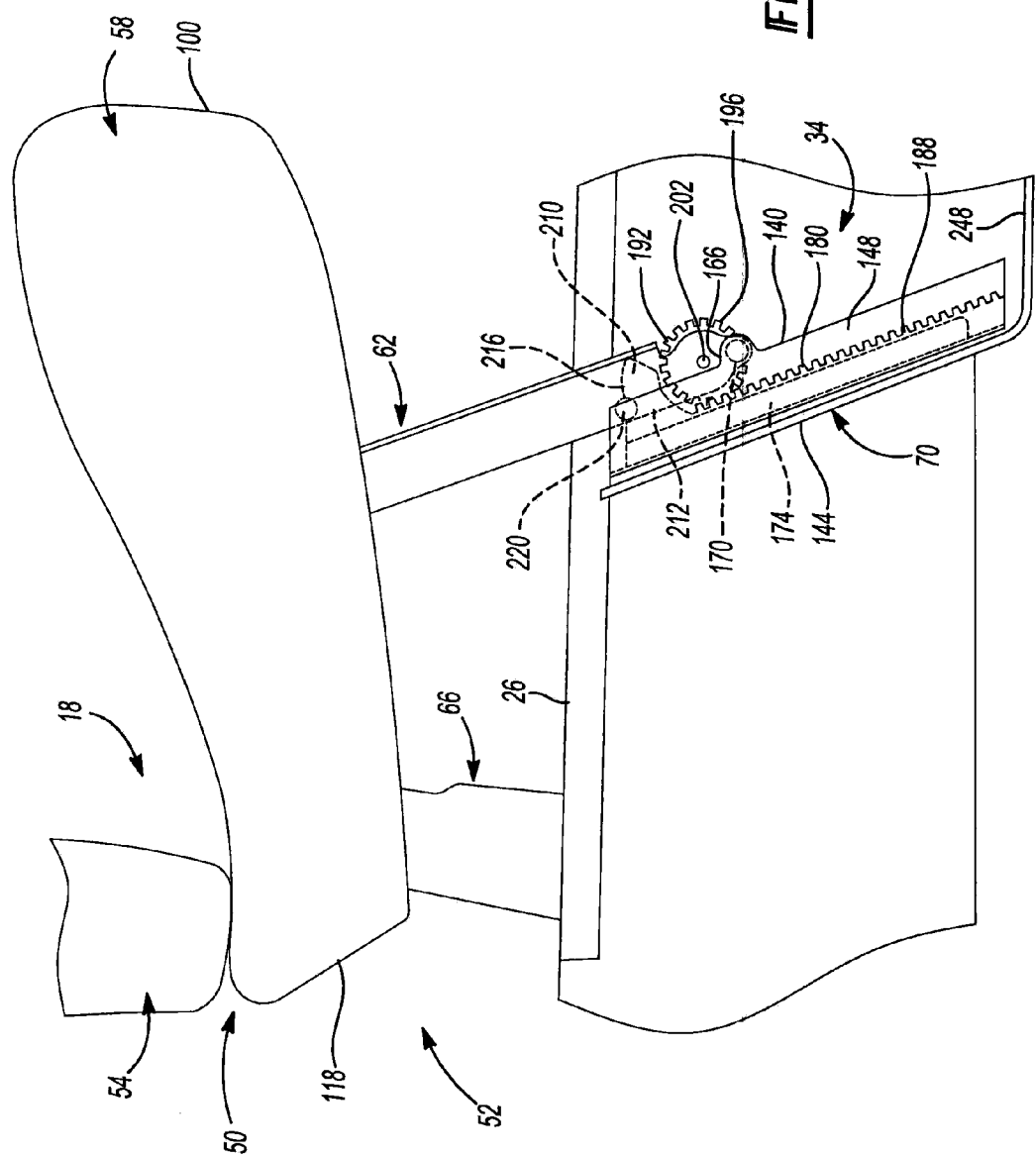
FIG. 4 is a partial side view of the outboard seat and articulation arrangement in the deployed position according to the principles of the present disclosure.

With particular reference to FIGS. 2-4 and 8, the articulation arrangement 70 associated with seat assembly 18 will now be discussed in greater detail. In the exemplary configuration illustrated, articulation arrangement 70 can include a bracket 140 positioned relative to a rearward end 144 of stowage recess 34, as generally shown in FIG. 2 with reference to FIG. 3. Bracket 140 can include a pair of U-shaped channels 148 at lateral or outboard ends 152 of bracket 140, and an outer or upper member 158 of each channel 148 can include a pocket or depression 166 configured to receive a guide member or dowel 170. A guide member or block 174 can be positioned inside each channel 148 and can include an upper surface 176 spaced apart from the outer member 158, as generally shown in FIG. 4 with reference to FIG. 3. In other words, a thickness of the guide members 174 can be less than an inside width or thickness of the U-shaped channels 148 such that there can be a space or gap between the guide members 174 and the respective outer members 158 that is configured to selectively receive the guide dowel 170. A pair of guide tracks 180 can be positioned proximate the guide members 174 and an edge 184 of each U-shaped channel 148.

In one exemplary configuration, the guide tracks 180 can include a toothed outer surface 188 configured to meshingly receive a toothed outer surface 192 of a pair of rotating members or rollers 196 associated with the lower ends 102 of front legs 62, as generally shown in FIG. 3. The guide dowels 170 can also be coupled to the lower ends 102 of legs 62 at a position below an axis 202 of rollers 196. An optional axle or rod 206 and bracket 208 can couple the lower ends 102 of legs 62 to each other, as also shown in FIG. 3.

Figure 8:
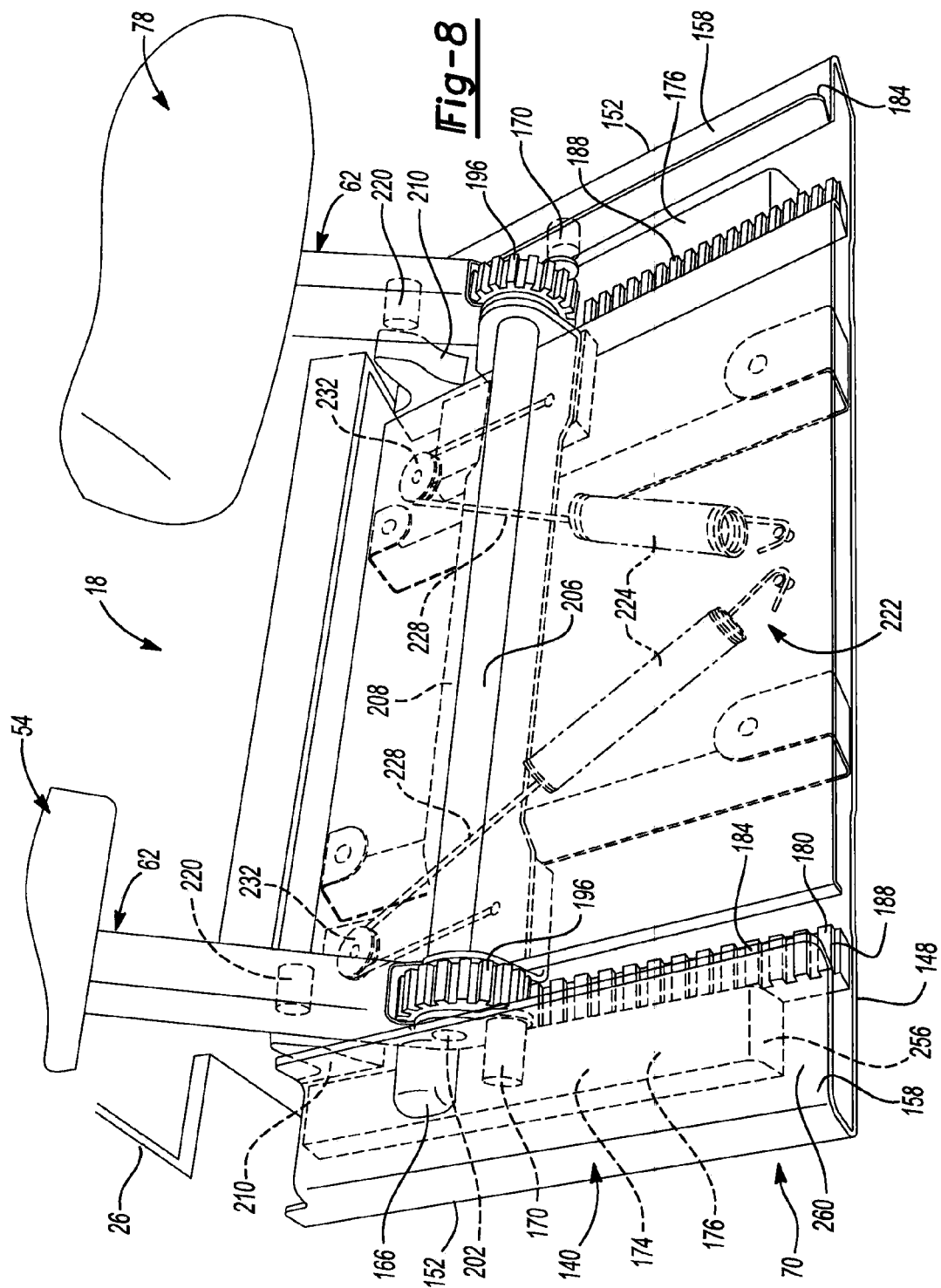
FIG. 8 is a partial perspective view of the articulation arrangement as the outboard seat is articulated toward a stowed position according to the principles of the present disclosure.

With particular reference to FIGS. 4 and 8, the articulation arrangement 70 can also include a pair of support members 210 positioned proximate an upper end 212 of guide tracks 180. Each support member 210 can include an arcuate upper surface 216 configured to receive a support rod 220 associated with front legs 62, as shown in FIGS. 4 and 8. The support rods 220 can rest on support members 210 when seat assembly 18 is in the stowed position, as generally shown in FIG. 4. The arcuate surface 216 can facilitate relative movement of rod 220 relative thereto when front legs 62 rotate about axis 202 of rollers 196. In one exemplary configuration, the support members 210 can nest within the front legs 62 when the seat assembly 18 is in the deployed position, as generally shown in FIGS. 3 and 4 with reference to FIG. 8.

The articulation arrangement 70 can also include an assist arrangement 222 configured to assist an operator or other user in providing a controlled lowering of the seat assembly 18 from the deployed position to the stowed position and assistance in raising the seat assembly 18 from the stowed position in stowage recess 34 to the deployed position, as will be discussed below in greater detail. In one exemplary configuration, the assist arrangement 222 can include a pair of elastic members 224 coupled at one end to vehicle 14 and at the other end relative to the front legs 62. In the exemplary configuration illustrated, the elastic members 224 can include springs coupled at one end to the bracket 140 and at the other end to the rod 206 or bracket 208, as shown for example in FIG. 3.

An optional cable 228 can be coupled to the springs 224 and routed around a pair of pulleys 232, as shown for example in FIG. 3. As will be discussed in greater detail below in connection with operation of seat assembly 18, the springs 224 can be stretched or elongated during downward travel of the seat assembly 18 toward the stowed position so as to provide a controlled lowering of seat assembly 18 based on the biasing force associated with springs 224. Similarly, the elongated springs 224 can provide assistance in raising seat assembly 18 from the stowed position using the same biasing force.

Figure 6:
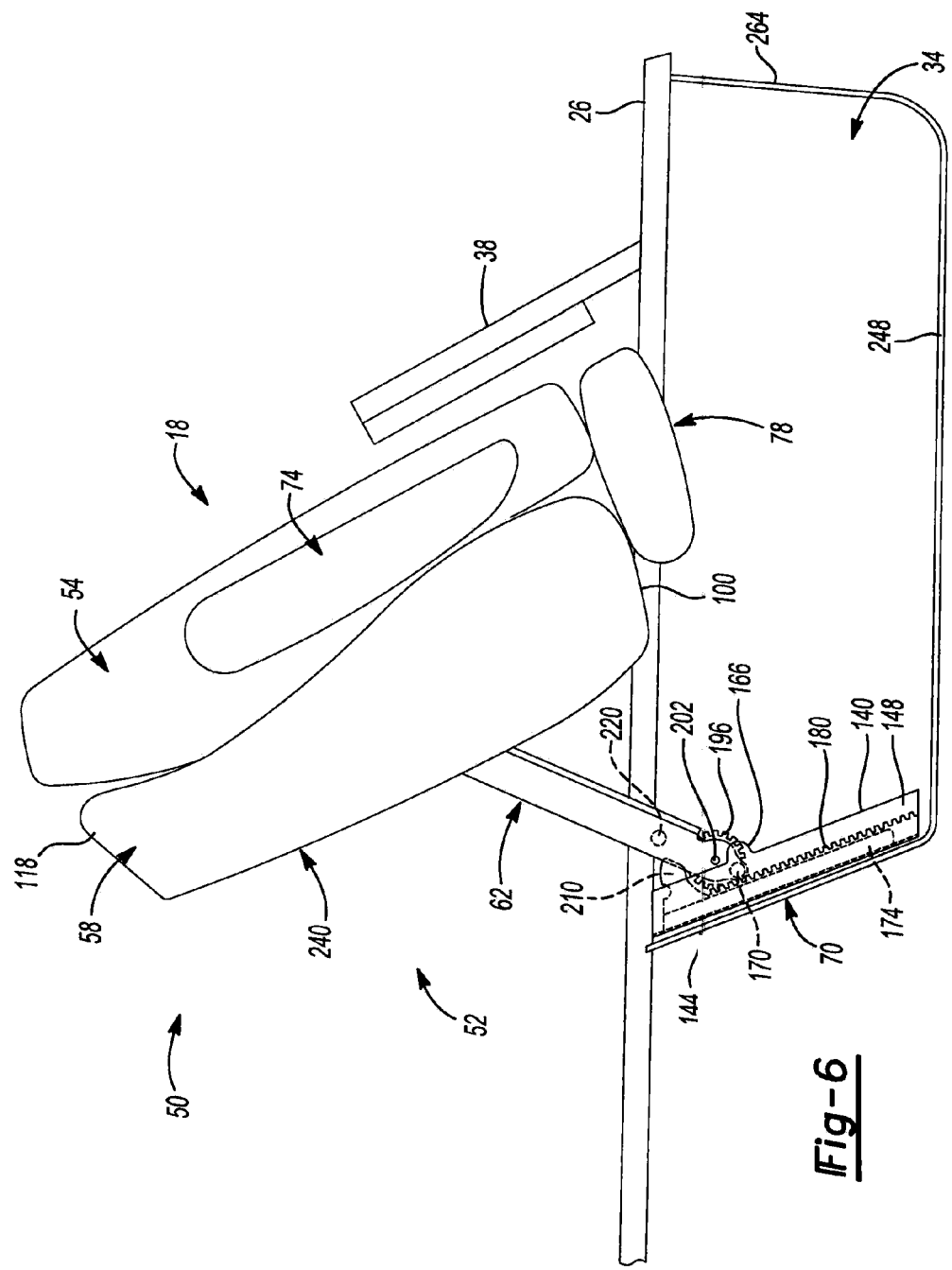
FIG. 6 is a side view of the outboard seat moved to a forward tipped position according to the principles of the present disclosure.

With particular reference to FIGS. 3-13C, operation of seat assembly 18 will now be discussed in greater detail. As briefly discussed above, release mechanism 82 can be actuated to collapse seat back 54 onto seat bottom 58, as shown for example in FIG. 5. The head rest 78 can also be collapsed forward, as shown in FIG. 5, upon actuation of release mechanism 82 in the manner discussed immediately above. Alternatively, head rest 78 can be manually collapsed or collapsed through a second release of release mechanism 82. The second release mechanism 86 can then be actuated to release the latch arrangement 128 associated with rear legs 66 from the floor 26 and/or associated vehicle structure. The rearward end 118 of seat bottom 58 can then be pivoted forward and upward about couplings 98 and 110 of front legs 62, as generally shown in FIG. 6. Such articulation of seat assembly 18 can automatically draw rear legs 66 into a tucked arrangement 240 relative to seat bottom 58, as also generally shown in FIG. 6. At this point in the articulation of seat assembly 18 from the deployed position toward the stowed position, the forward end of seat bottom 58 can tip downward into stowage recess 34, as also shown in FIG. 6.

Figure 7:
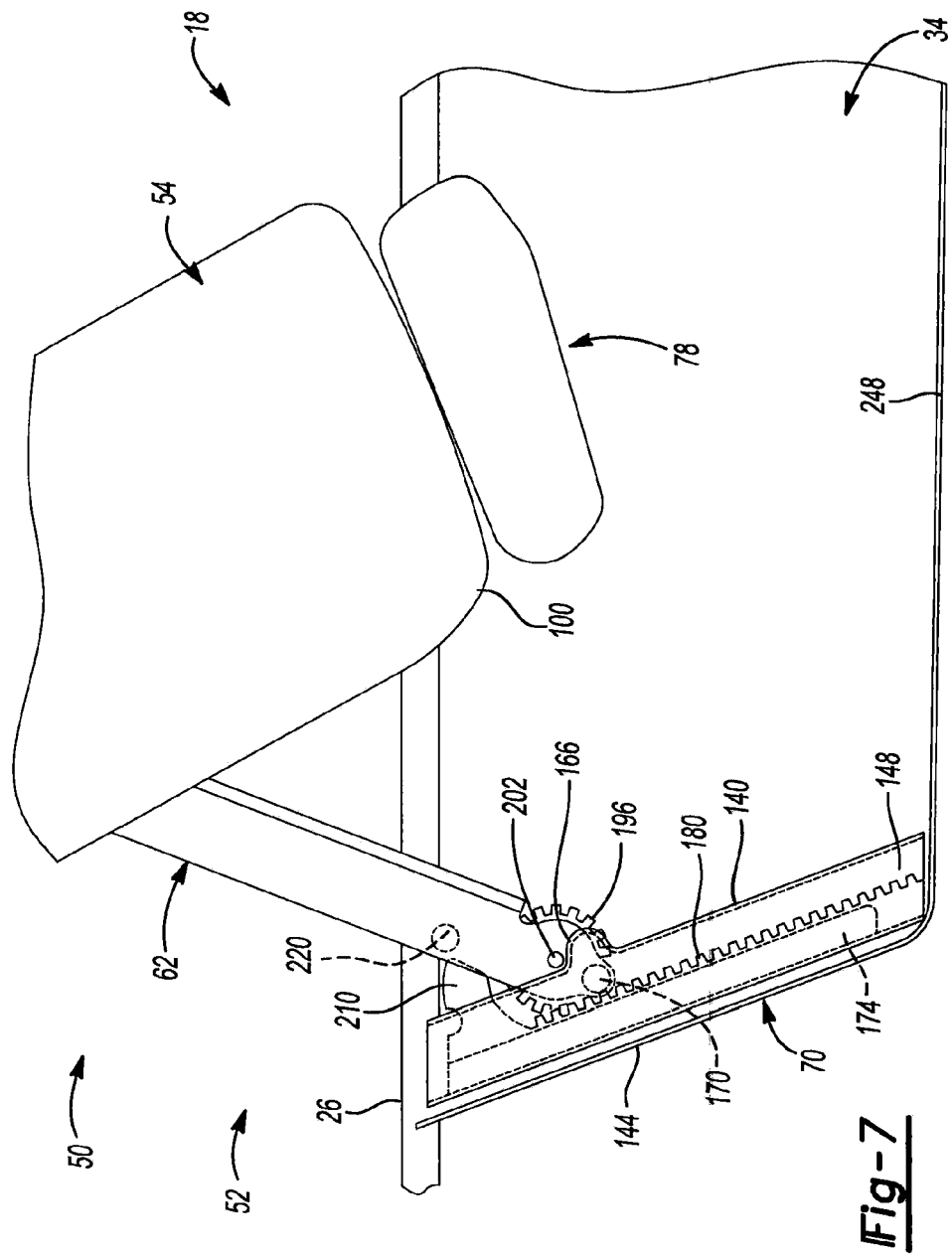
FIG. 7 is an enlarged side view of the articulation arrangement and front legs of FIG. 6 according to the principles of the present disclosure.

As can be seen in FIG. 7 with reference to FIG. 6, the forward articulation of seat assembly 18 can rotate front legs 62 forward in the vehicle about axis 202/pivotable coupling 106 such that support rods 220 move over the arcuate surface 216 of support members 210 to a point beyond the support members 210. At this point, guide dowel 170 can be pivoted out of pocket 166 based on dowel 170 being positioned below axis 202/coupling 106. Once support rods 220 are no longer resting on support members 210 and guide dowels 170 are positioned out of pockets 166, the front legs 62 can travel downward toward a bottom 248 of stowage recess 34, as will be discussed in greater detail below.

Figure 9:
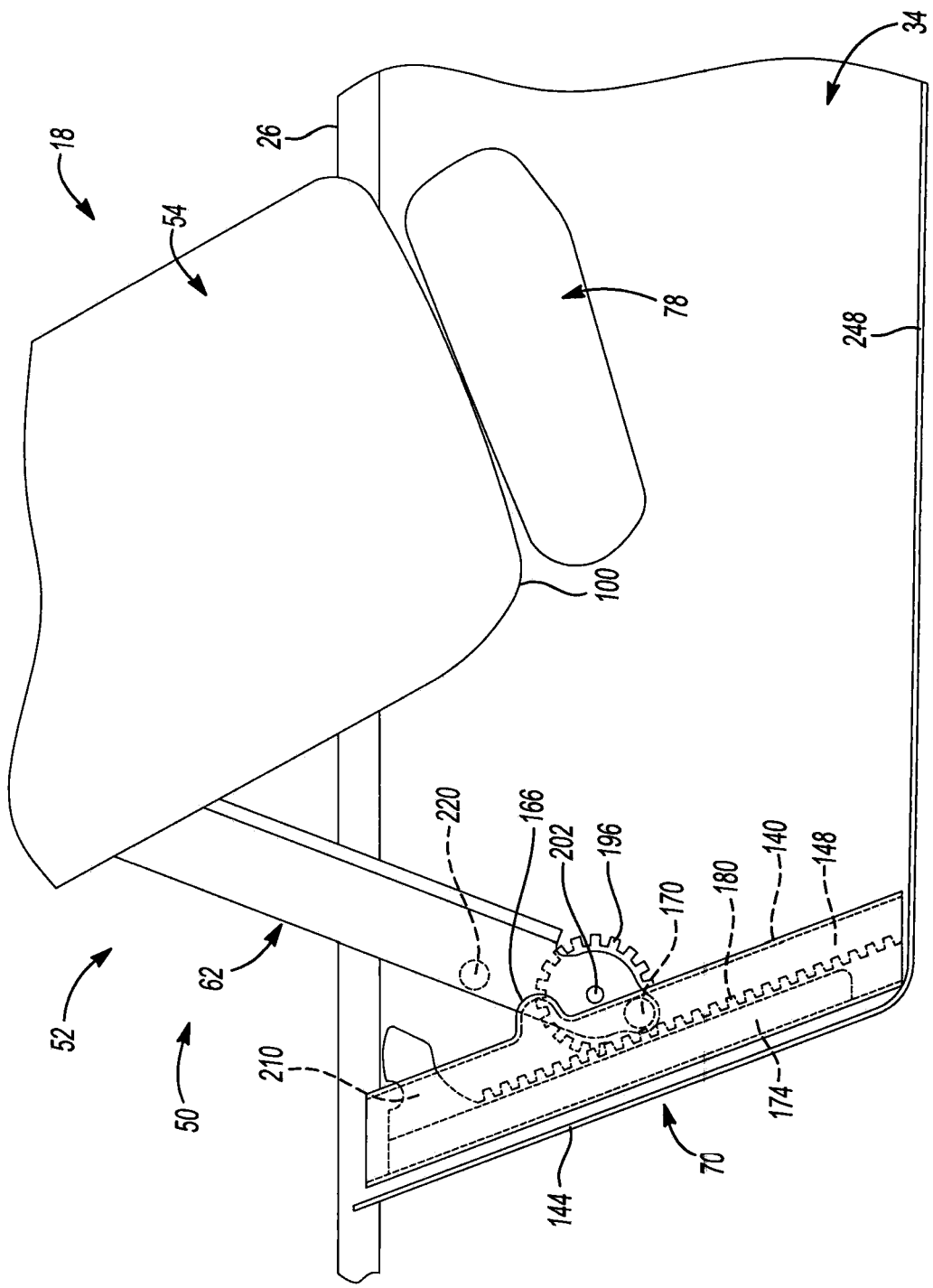
FIG. 9 is a partial side view of the articulation arrangement as the outboard seat is articulated toward the stowed position according to the principles of the present disclosure.

With particular reference to FIGS. 8 and 9, the stowable seat assembly 18 can travel downward toward the bottom 248 of stowage recess 34 with the guide dowels 170 being guided between the outer surface 176 of guide members 174 and the outer member 158 of bracket 140 such that rollers 196 roll down the guide tracks 180. In particular, as shown for example in FIG. 8, the teeth 192 of rollers 196 can meshingly engage the teeth 188 of guide tracks 180 as rollers 196 roll down guide tracks 180. The guide dowels 170 can be movably captured between the upper surface 176 of guide members 174 and the outer member 158 of bracket 140 such that the guide dowels 170 both guide the front legs 62 in downward movement toward the bottom 248 of stowage recess 34 as well as maintain engagement of the toothed rollers 196 with the guide tracks 180.

As the guide dowels 170 are pivoted out of the respective pockets 166 and the front legs 62 begin to travel downward toward the bottom 248 of stowage recess 34, tension can be placed on springs 224 of assist arrangement 222. This tension can result from the front legs 62 pulling cables 228 downward toward bottom 248 about pulleys 232, as shown in FIG. 8 in comparison to FIG. 3. Such movement of front legs 62 and cable 228 place additional tension on springs 224, which can result in a biasing force against further stretching or elongation of springs 224 based on a spring rate associated with springs 224. The spring rate can be tuned to provide a controlled downward movement of seat assembly 18 as the front legs 62 travel toward the bottom 248 of stowage recess 34 about rollers 196. This can be seen in FIG. 10, for example, where springs 224 are further elongated with the front legs 62 positioned adjacent the bottom 248 of stowage recess 34.

Figure 10:
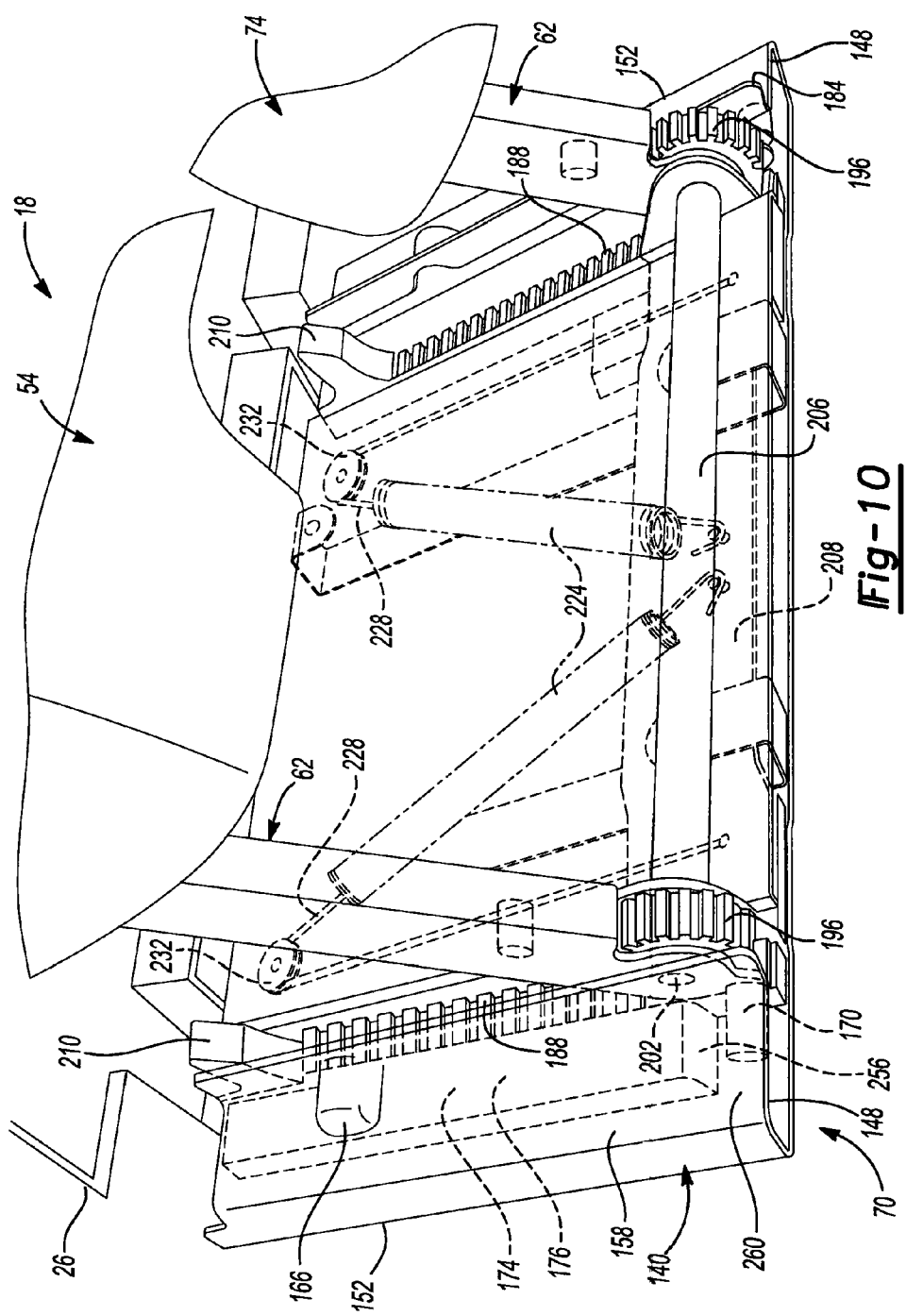
FIG. 10 is a partial perspective view of the articulation arrangement as the outboard seat is further articulated toward the stowed position according to the principles of the present disclosure.
Figure 11:
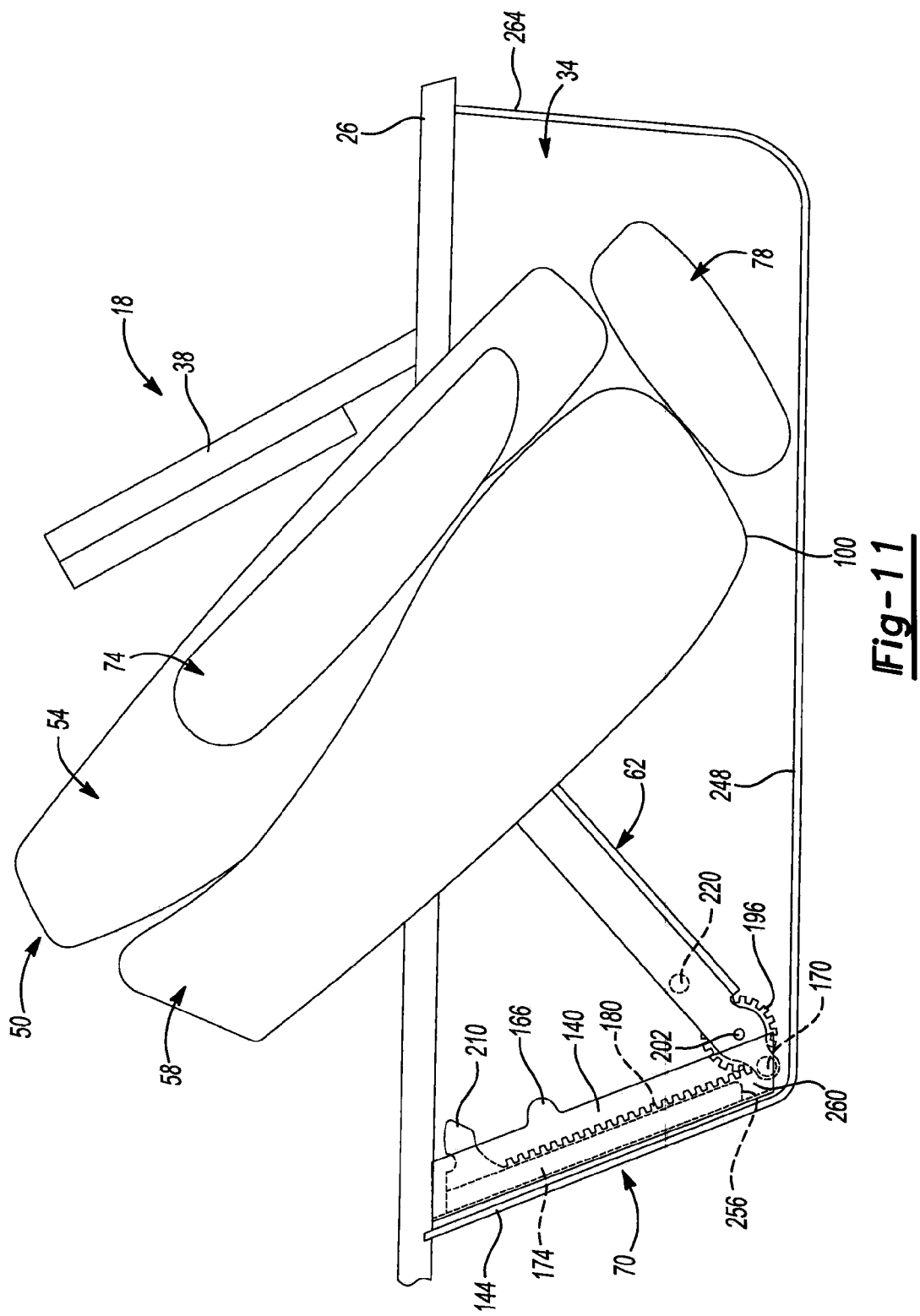
FIG. 11 is a partial side view of the articulation arrangement as the outboard seat is further articulated toward the stowed position according to the principles of the present disclosure.
Figure 12A:
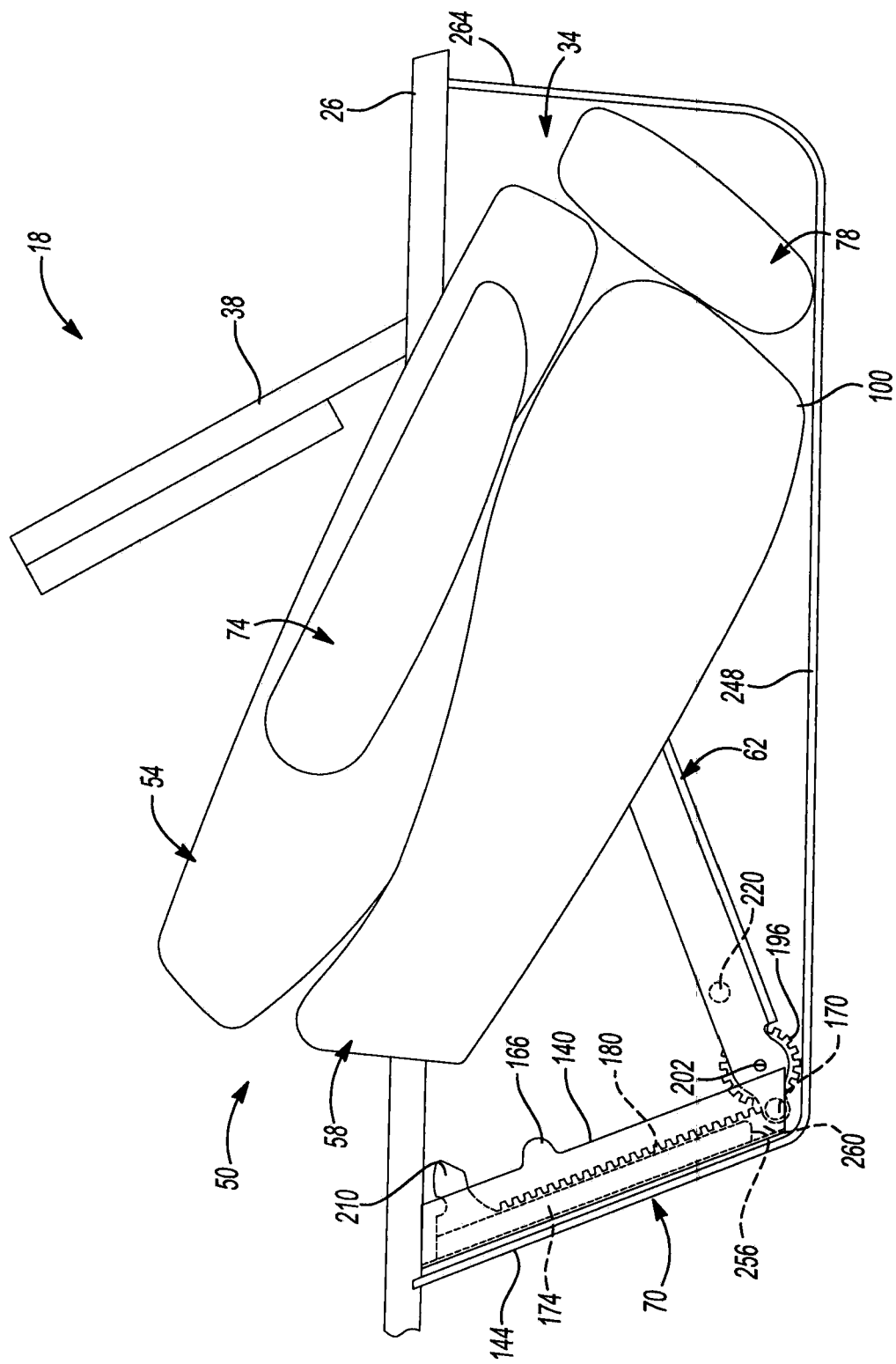
FIG. 12A is a partial side view of the outboard seat being further articulated toward the stowed position according to the principles of the present disclosure.

As can be seen in FIGS. 10-12B, the seat assembly 18 can be articulated forward and downward to position seat assembly 18 in stowage recess 34 without having to flip over or invert seat assembly 18. This action can further pivot front legs 62 about axis 202/pivotable coupling 106 when front legs 62 reach the end of guide tracks 180 adjacent the bottom 248 of stowage recess 34. With particular reference to FIGS. 10 and 11, the guide members 174 can have a lower end 256 spaced apart from the bottom 248 of stowage recess 34 so as to provide a space or gap 260 between end 256 and bottom 248. The gap 260 can allow guide dowel 170 to articulate rearward once front legs 62 reach the bottom 248 and guide dowel 170 is positioned below guide member 174. In this regard, it should be appreciated that while guide dowel 170 is movably captured between bracket 140 and guide member 174 during downward travel of front legs 62 (e.g., before gap 260), the front legs 62 can be limited in their ability to pivot forward about axis 202/pivotable coupling 106 beyond the position shown in FIGS. 8-9 due to the spaced apart relationship between guide dowel 170 and axis 202.

Figure 13A:
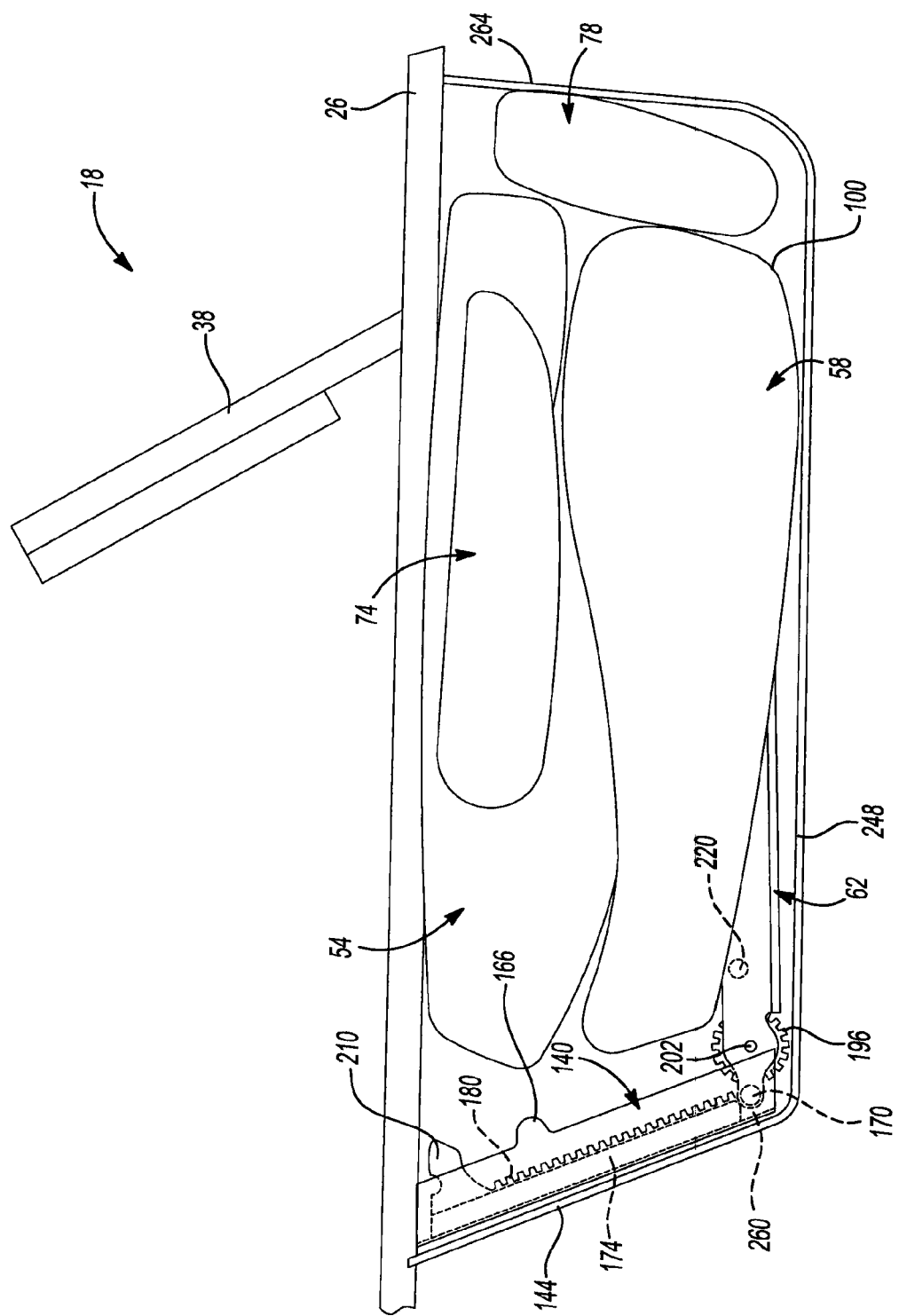
FIG. 13A is a partial side view of the outboard seat in the stowed position in the stowage recess according to the principles of the present disclosure.
Figure 13B:
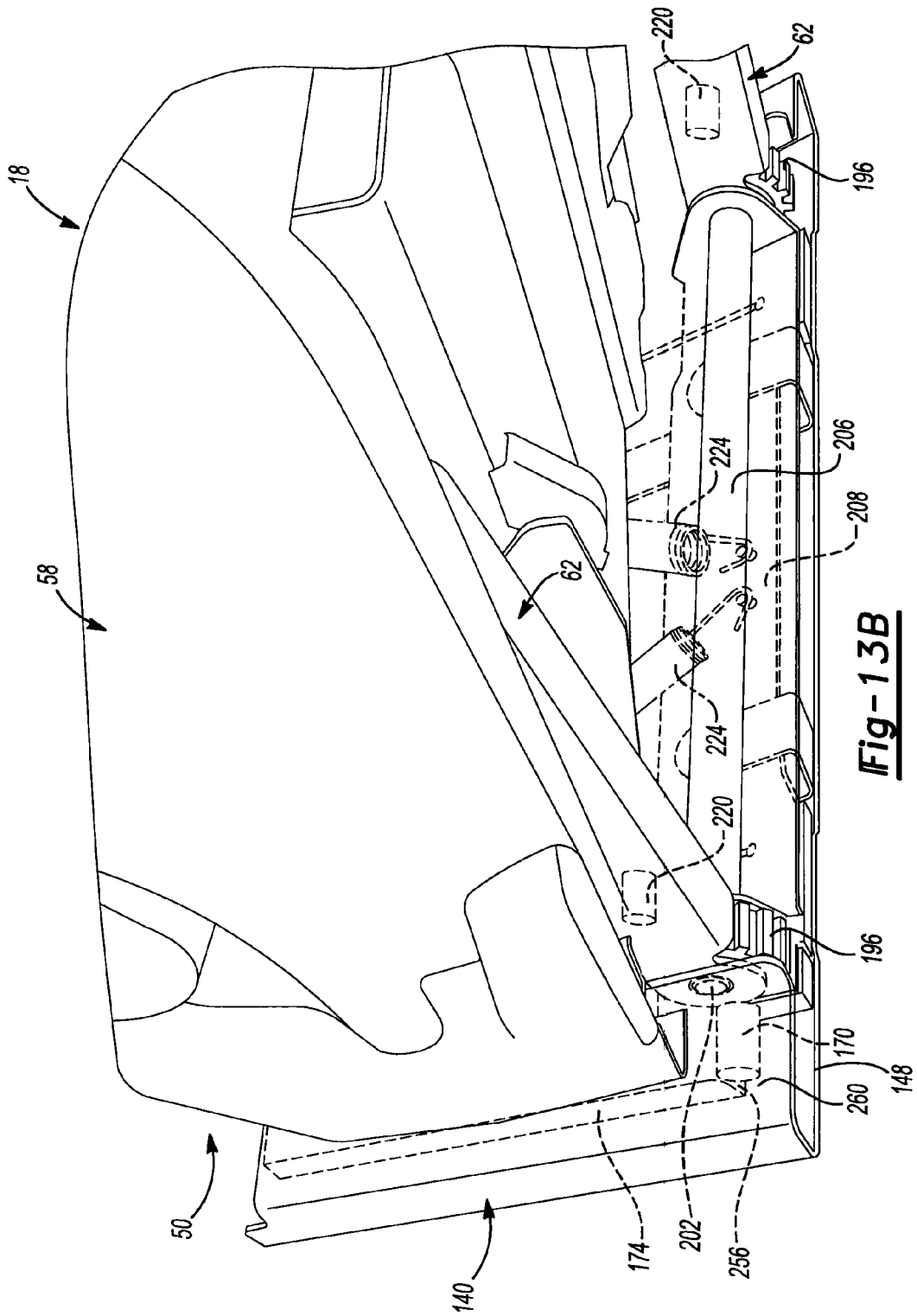
FIG. 13B is a partial bottom perspective view of the articulation arrangement and seat bottom when the outboard seat is in the stowed position according to the principles of the present disclosure.
Figure 13C:
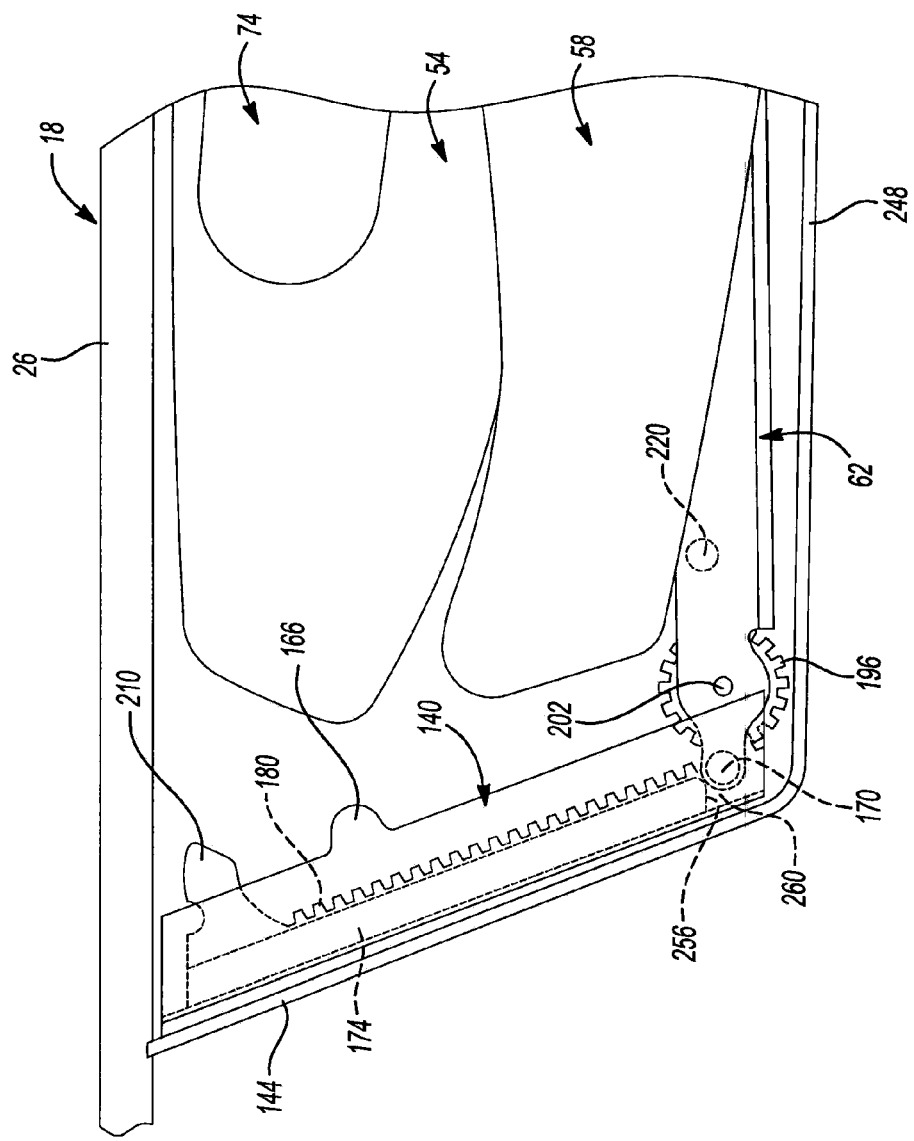
FIG. 13C is an enlarged side view of the articulation arrangement with the outboard seat in the stowed position in a stowage recess according to the principles of the present disclosure.

With reference to FIGS. 12A and 13A-13C, the seat assembly 18 can then be further articulated forward and downward to the stowed position shown in FIGS. 13A and 13C. In particular, the front legs 62 can further pivot about axis 202/pivotable coupling 106 and pivotable coupling 98 to facilitate moving the forward end 100 toward a forward end 264 of stowage recess 34 and moving the rearward end downward toward the bottom 248 of stowage recess 34. In the stowed position shown in FIG. 13A, the seat assembly 18 can be parallel or substantially parallel to the floor 26 and the bottom 248 of stowage recess 34 thus providing a flat load floor configuration (FIGS. 13A and 13C) when cover 38 is closed over seat assembly 18 in the stowed position. As discussed above, a seating side 268 of seat bottom 58 can remain facing opposite the floor 26 in the stowed position such that the seat assembly 18 does not need to be flipped over or inverted during stowing process.

Seat assembly 18 can be articulated from the stowed position of FIGS. 13A-13C to the deployed position shown in FIG. 1 by generally reversing the process discussed immediately above for seat assembly 18. In this regard, the assist arrangement 222 can assist the operator in raising or lifting seat assembly 18 from the stowed position in storage recess 34. In particular, the biasing force associated with springs 224 in the elongated or stretched position shown in FIG. 10 can provide a force via cable 228 in a direction upward or away from bottom 248 of recess 34. This force can assist the operator in raising the front legs 62 from the bottom of guide tracks 180 to the position shown in FIG. 3 where guide dowel 170 can be positioned in depression 166. Again, seat assembly 18 does not need to be flipped over during the process of articulating the seat assembly 18 from the stowed position to the deployed position.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A stowable seat assembly for a vehicle having a floor, the seat assembly comprising:
    a seat bottom;
    a seat back coupled relative to the seat bottom;
    a pair of front legs each having an upper end and an opposite lower end, each upper end pivotably coupled to the seat bottom;
    a pair of rear legs pivotably coupled to the seat bottom; and
    an articulation arrangement, including:
        a pair of rotating members rotatably coupled to the lower ends of the front legs;
        a pair of guide channels each having a first guide member positioned therein;
        a pair of second guide members coupled to the lower ends of the front legs and each positioned in one of the pair pf guide channels; and
        an assist arrangement including a biasing member coupled to the vehicle and the front legs;
    the seat assembly being selectively movable from a deployed position to a stowed position whereby the seat bottom is articulated forward and downward about the front legs to the stowed position during which the second guide members are selectively movable within the guide channels and relative to the first guide members to enable the front legs to selectively translate from a first position associated with the deployed position to a second position associated with the stowed position of the seat assembly;
    the biasing member being configured to provide a biasing force against the translation of the front legs in a first direction from the first position to the second position, and a biasing force assisting in the translation of the front legs in a second opposite direction from the second position toward the first position,
    wherein the upper ends and the lower ends of the front legs move vertically relative to the floor while the front legs translate between the first and second positions.

2. The seat assembly of claim 1, wherein the seat bottom includes a lower side facing the vehicle floor and an opposite seating side, the lower side facing the vehicle floor when the stowed seat is in the deployed and stowed positions and during articulation therebetween.

3. The seat assembly of claim 1, wherein the seat bottom includes a forward end and an opposite rearward end, and wherein the front legs are pivotably coupled to the seat bottom proximate the forward end and the rear legs are pivotably coupled to the seat bottom proximate the rearward end.

4. The seat assembly of claim 1, wherein the articulation arrangement is associated with a recess below the floor of the vehicle, the recess configured to receive the seat assembly in the stowed position; and
    wherein the first position of the front legs is proximate an upper end of the guide channels adjacent the floor and the second position of the front legs is proximate a lower end of the guide channels adjacent a bottom of the recess.

5. The seat assembly of claim 4, wherein the articulation arrangement further comprises guide tracks and wherein the rotating members comprise rollers having a toothed outer surface meshingly engaged with a toothed outer surface of the guide tracks.

6. The seat assembly of claim 5, wherein the first guide members comprise guide blocks and the second guide members comprise guide dowels that are movably captured in the guide channels.

7. The seat assembly of claim 6, wherein the guide channels each include a pocket that receives the guide dowels when the seat assembly is in the deployed position, the pockets positioned proximate the upper end of the guide channels.

8. The seat assembly of claim 7, wherein the guide dowels are positioned closer to the lower end of the front legs than an axis of the rollers such that pivoting the front legs forward about the axis of the rollers moves the guide dowels out of the pocket to enable the guide dowels to move relative to the guide blocks while being captured in the guide channels.

9. The seat assembly of claim 8, wherein the guide dowels are captured between the guide blocks and an outer member of the guide channels, the capturing of the guide dowels limiting forward pivoting of the front legs about the axis of the rollers to a predetermined amount.

10. The seat assembly of claim 9, wherein a lower end of the guide blocks is spaced apart from a bottom of the recess and a corresponding bottom of the guide tracks to enable further forward pivoting of the front legs about the axis of the rollers when the rollers are positioned at the bottom of the guide tracks.

11. The seat assembly of claim 10, wherein the guide dowels travel into a gap formed between the lower end of the guide blocks and the bottom of the stowage recess thereby enabling the further forward pivoting of the front legs to the stowed position.

12. A stowable seat assembly for a vehicle having a floor, the seat assembly comprising:
   a seat bottom;
   a seat back coupled relative to the seat bottom;
   a pair of front legs each having an upper end and an opposite lower end, each upper end pivotably coupled to the seat bottom;
   a pair of rear legs pivotably coupled to the seat bottom; and
   an articulation arrangement, including:
      a pair of rotating members rotatably coupled to the lower ends of the front legs;
      a pair of guide channels each having a first guide member positioned therein;
      a pair of second guide members coupled to the lower ends of the front legs and each positioned in one of the pair of guide channels; and
      an assist arrangement including a biasing member coupled to the vehicle and the front legs;
   the seat assembly being selectively movable from a deployed position to a stowed position whereby the seat bottom is articulated forward and downward about the front legs to the stowed position during which the second guide members are selectively movable within the guide channels and relative to the first guide members to enable the front legs to selectively translate from a first position associated with the deployed position to a second position associated with the stowed position of the seat assembly;
   the biasing member being configured to provide a biasing force against the translation of the front legs in a first direction from the first position to the second position, and a biasing force assisting in the translation of the front legs in a second opposite direction from the second position toward the first position,
   wherein the biasing member includes a spring coupled at one end to the vehicle and at an opposite end to the front legs such that translation of the front legs from the first position to the second position elongates the spring thereby providing the biasing force against translation of the front legs in the first direction.

13. The seat assembly of claim 12, wherein the spring includes a pair of springs each coupled to the front legs.

14. The seat assembly of claim 12, wherein the assist arrangement further comprises a cable and a pulley, the pulley secured to the vehicle and the cable routed from the spring around the pulley and coupled to the front legs.

15. A stowable seat assembly for a vehicle having a floor and a stowage recess, the seat assembly comprising:
   a seat bottom having a forward end and an opposite rearward end;
   a seat back coupled relative to the seat bottom;
   a pair of front legs each having an upper end and an opposite lower end, each upper end pivotably coupled to the seat bottom proximate the forward end;
   a pair of rear legs pivotably coupled to the seat bottom proximate the rearward end; and
   an articulation arrangement, including:
      a pair of rotating members rotatably coupled to the lower ends of the front legs;
      a pair of guide channels each having a first guide member positioned therein;
      a pair of second guide members coupled to the lower ends of the front legs and each positioned in one of the pair of guide channels;
      a pair of guide tracks, the pair of rotating members being in selective movable engagement with the pair of guide tracks; and
      an assist arrangement including a biasing member coupled to the vehicle and the front legs;
   the seat assembly being selectively movable from a deployed position to a stowed position whereby the seat bottom is articulated forward and downward about the front legs to the stowed position in the stowage recess during which the second guide members are selectively movable in the guide channels and relative to the first guide members to enable the front legs to selectively translate from a first position associated with the deployed position to a second position associated with the stowed position of the seat assembly;
   the biasing member being configured to provide a biasing force against the translation of the front legs in a first direction from the first position to the second position, and a biasing force assisting in the translation of the front legs in a second opposite direction from the second position toward the first position,
   wherein the upper ends and the lower ends of the front legs move vertically relative to the floor while the front legs translate between the first and second positions.

16. The seat assembly of claim 15, wherein the articulation arrangement is positioned in the recess below the floor of the vehicle, and wherein the first position of the front legs is proximate an upper end of the guide channels adjacent the floor and the second position of the front legs is proximate a lower end of the guide channels adjacent a bottom of the recess.

17. The seat assembly of claim 15, wherein the rotating members comprise rollers having a toothed outer surface meshingly engaged with a toothed outer surface of the guide tracks; and
   wherein the first guide members comprise guide blocks and the second guide members comprise guide dowels that are selectively movably captured in the guide channels.

18. The seat assembly of claim 17, wherein the guide channels each include a pocket that receives the guide dowels when the seat assembly is in the deployed position, the pockets positioned proximate the upper end of the guide channels.

19. The seat assembly of claim 17, wherein the guide dowels are positioned closer to the lower end of the front legs than an axis of the rollers such that pivoting the front legs forward about the axis of the rollers moves the guide dowels out of the pockets to enable the guide dowels to move relative to the guide blocks while being captured in the guide channels; and
   wherein the guide dowels are captured between the guide blocks and an outer member of the guide channels, the capturing of the guide dowels limiting forward pivoting of the front legs about the axis of the rollers to a predetermined amount.

20. The seat assembly of claim 15, wherein the biasing member includes a spring coupled at one end to the vehicle and at an opposite end to the front legs such that translation of the front legs from the first position to the second position elongates the spring thereby providing the biasing force against translation of the legs in the first direction; and
   wherein the assist arrangement further comprises a cable and a pulley, the pulley secured to the vehicle and the cable routed from the spring around the pulley and coupled to the front legs.

* * * * *